United States Patent [19]

Muraoka et al.

[11] Patent Number: 5,544,145
[45] Date of Patent: Aug. 6, 1996

[54] REGENERATION OF PHOTOGRAPHIC DATA STORED IN A CD-PLAYER

[75] Inventors: Masaru Muraoka; Shingo Izuta, both of Daito, Japan

[73] Assignee: Funai Electric Co., Ltd., Daito, Japan

[21] Appl. No.: 66,900

[22] Filed: May 21, 1993

[30] Foreign Application Priority Data

May 25, 1992 [JP] Japan .................................. 4-158741

[51] Int. Cl.$^6$ ...................................................... G11B 7/00
[52] U.S. Cl. .............................. 369/125; 369/32; 369/47; 395/162; 395/102
[58] Field of Search .................................. 369/38, 52, 58, 369/47, 126; 395/102, 162, 164, 131; 358/403, 488, 335, 906

[56] References Cited

U.S. PATENT DOCUMENTS

| | | | |
|---|---|---|---|
| 4,888,648 | 12/1989 | Takeuchi et al. | 358/335 |
| 5,224,178 | 6/1993 | Madden et al. | 382/50 |
| 5,270,831 | 12/1993 | Parulski et al. | 358/403 |
| 5,282,187 | 1/1994 | Lee | 369/58 |
| 5,301,172 | 4/1994 | Richards et al. | 369/32 |
| 5,347,621 | 9/1994 | Yutaka | 395/164 |
| 5,355,450 | 10/1994 | Garmon et al. | 395/162 |
| 5,381,526 | 1/1995 | Ellson | 395/162 |
| 5,414,811 | 5/1995 | Parulski et al. | 395/162 |

*Primary Examiner*—Georgia Y. Epps
*Assistant Examiner*—Kim-Kwok Chu
*Attorney, Agent, or Firm*—Lackenbach Siegel Marzullo Aronson & Greenspan, P.C.

[57] ABSTRACT

This invention provides a method of regenerating photographic data by combining a few external devices to a conventional video gaming device which is presently popular. In this method, photographic data stored in an optical disk are read out through a CD-ROM driver connected to the interface which is connectable with external memorizing devices and regenerated, in conformity with a system-controlling program and a CD-ROM controlling program each stored in a cassette ROM connected to the interface which is connectable with external memorizing devices, and a display data-preparing program enlarging said photographic data, and a utility program performing dealing and controlling of the referring, zooming and panning operations of said photographic data each stored in said cassette ROM or in another external memorizing device.

4 Claims, 11 Drawing Sheets

REGENERATION OF PHOTOGRAPHIC DATA STORED IN A CD-PLAYER

BACKGROUND OF THE INVENTION

This invention relates to a regenerating method of photographic data, and more particularly, to a playing-back method of photographic data compressed and memorized in an optical disk without applying an exclusive regenerating device, but by only applying a conventional video gaming device and the like.

In FIG. 1, a block diagram composing a conventional video gaming device is shown. As shown in FIG. 1, said video gaming device identified by the numeral 1 is composed of:

an interface 1a connected to a cassette ROM 2 which stores a system-controlling program and an application program for said gaming device and the others;

a central processing unit 1b (hereafter referred to as CPU);

RAM 1c functioning as a working area;

an enlarged interface 1d interfacing with controlling signals for a CD-ROM driver 3 and other data;

a voice regenerator 1f temporarily memorizing voice data delivered from said CPU 1b to a voice RAM 1e, or converting said voice data read out from said voice RAM 1e to voice signals;

an image displayer 1h temporarily memorizing said image data controlled and sent from said CPU 1b in image displaying RAM 1g or converting said image data read out from said image displaying RAM 1g to image signals; and a control pad interface 1j receiving keyed-in input signals from a control pad 1i, and sending said signals to said CPU 1b.

This video gaming device regenerates image data or voice data stored in said cassette ROM 2 or in a compact disk inserted in said CD-ROM driver 3, after outputted image signals from said image displayer 1h displaying said images on the (not shown) displaying device, and also after outputted voice signals from said voice regenerator 1f, outputs said voice from the (not shown) speaker.

Recently, technology has been developed making obtainable not only photographic images but photo prints having equal properties with the conventional photographs by digitizable regenerations of said photographic data in a micro processor or the like after said photographic data is stored in an optical disk having vast memorizing capacity in the form of digitized signals. By applying this new technology, it becomes possible to regenerate said photographic data stored in said optical disk having vast memorizing capacity by means of the regenerating device provided with software playing back said photographic data.

In general, conventional video gaming devices excepting the above-mentioned exclusive regenerating device, are not constructed so as to be able to regenerate said photographic data stored in said optical disk from the standpoint of both software and hardware. Accordingly, as it is impossible to regenerate said photographic data stored in said optical disk, it needs the reconstruction of said devices from the standpoint of both software and hardware. One resulting problem is that a regenerating device for playing back said photographic data is required. Further, it is difficult to obtain said regenerating device on account of its high cost.

This invention was achieved in order to solve the above-mentioned problems, and has as an object to supply a regenerating method enabling the regeneration of said photographic data by simply appending external devices to said conventional video gaming devices which are at present popularly available. Said regenerating method of photographic data according to this invention reads said photographic data stored in said optical disk, and regenerates said data through a CD-ROM driver connected to an interface connectable with external memorizing devices, in conformity with a system-controlling program and a CD-ROM controlling program both stored in ROM connected with the interface connectable with external memorizing devices, and a display data-preparing program performing the enlarging operation of said photographic data, stored in said ROM or in another external device out of said ROM and a utility program dealing and controlling of referring, zooming and panning operations of said photographic data.

SUMMARY OF THE INVENTION

In this regenerating method of photographic data according to this invention, said RAM functioning as a working area connected to said interface connectable with external memorizing devices is used as an area for enlarging said photographic data read out from said optical disk, and then said photographic data stored in said optical disk is read-out through said CD-ROM driver connected to said interface connectable with external memorizing devices and regenerated, in conformity with a system-controlling program and a CD-ROM controlling program both stored in said ROM connected to said interface connectable with external memorizing devices, a display data preparing program enlarging said photographic data and a utility program performing dealing and controlling of referring, zooming and panning operations of said photographic data, stored both in said ROM or in another external device out of said ROM.

Furthermore, in this regenerating method of photographic data according to this invention, said photographic data stored in said optical disk are read out through said CD-ROM driver connected to said interface connectable with an external memorizing device, said read-out photographic data are enlarged in said data enlarging device, and finally regenerated, in conformity with a system controlling program and a CD-ROM controlling program stored both in said ROM connected to said interface connectable with external memorizing devices, and a display data preparing program enlarging said photographic data and a utility program performing dealing and controlling of referring, zooming and panning operations of said photographic data, stored both in said ROM or in another external device out of said ROM and an enlarging device controlling program.

Furthermore, in this method of regenerating photographic data according to this invention, a printer is connected to said interface connectable with external memorizing devices, said read out and regenerated photographic data from said optical disk through said CD-ROM driver connected to said interface connectable with external memorizing devices, are printed out from said printer, in conformity with a printer controlling program and a print-out data-dealing program stored both in said ROM connected to said interface connectable with external memorizing devices or in another external memorizing device out of said ROM.

Also, in this method of regenerating photographic data according to this invention, said photographic data stored in said optical disk are read out and regenerated through said CD-ROM driver connected with said interface connectable with external memorizing devices, in conformity with a system-controlling program and a CD-ROM controlling program stored both in said ROM connected with said interface connectable with an external memorizing device, and a display data-preparing program enlarging said photographic data and a utility program which deals and controls referring, zooming and panning operations of said photographic data stored both in said ROM or in other external memorizing devices out of said ROM.

Also in this method of regenerating photographic data according to this invention, said photographic data are read out and regenerated from said optical disk through said CD-ROM driver connected with said interface connectable with external memorizing devices after being enlarged in said RAM which are used as a working area, connected with said interface connectable with external memorizing devices, in conformity with a system-controlling program and a CD-ROM controlling program both stored in said ROM connected with said interface connectable with external memorizing devices, and a display data-preparing program enlarging said photographic data, and a utility program dealing and controlling referring, zooming and panning operations of said photographic data stored both in said ROM or in another external memorizing device out of said ROM. Accordingly, in this regenerating method, it is possible to regenerate said photographic data and to use it by adding a few external devices to said conventional video gaming devices which are at present popularly availed.

Further, in this method of regenerating photographic data according to this invention, said photographic data is read out from said optical disk through said CD-ROM driver connected with said interface connectable with external memorizing devices, and said read-out photographic data from said optical disk are enlarged in said enlarging device, and then regenerated, in conformity with a system-controlling program and a CD-ROM controlling program, stored both in said ROM connected with said interface connectable with external memorizing devices, and a display data-preparing program which enlarges said photographic data, and a utility program performing dealing and controlling of referring, zooming and panning operations of said photographic data, stored both in said ROM or in another external device out of said ROM. Accordingly, in this regenerating method, it is possible to regenerate said photographic data with the addition of a few external devices to the conventional video gaming devices which are at present popularly available.

Furthermore, in this method of regenerating photographic data according to this invention, a printer connected with said interface connectable with an external memorizing device, prints out said photographic data read out from said optical disk, in conformity with a printer-controlling program and a print out data-dealing program, both stored in said ROM or in another external memorizing device out of said ROM. Accordingly, in this method of regenerating photographic data, it is possible to regenerate and to print out said photographic data with the addition of a few external devices to the conventional video gaming devices which are at present popularly available.

DETAILED DESCRIPTION OF THE INVENTION (The first embodiment)

Figure 1:
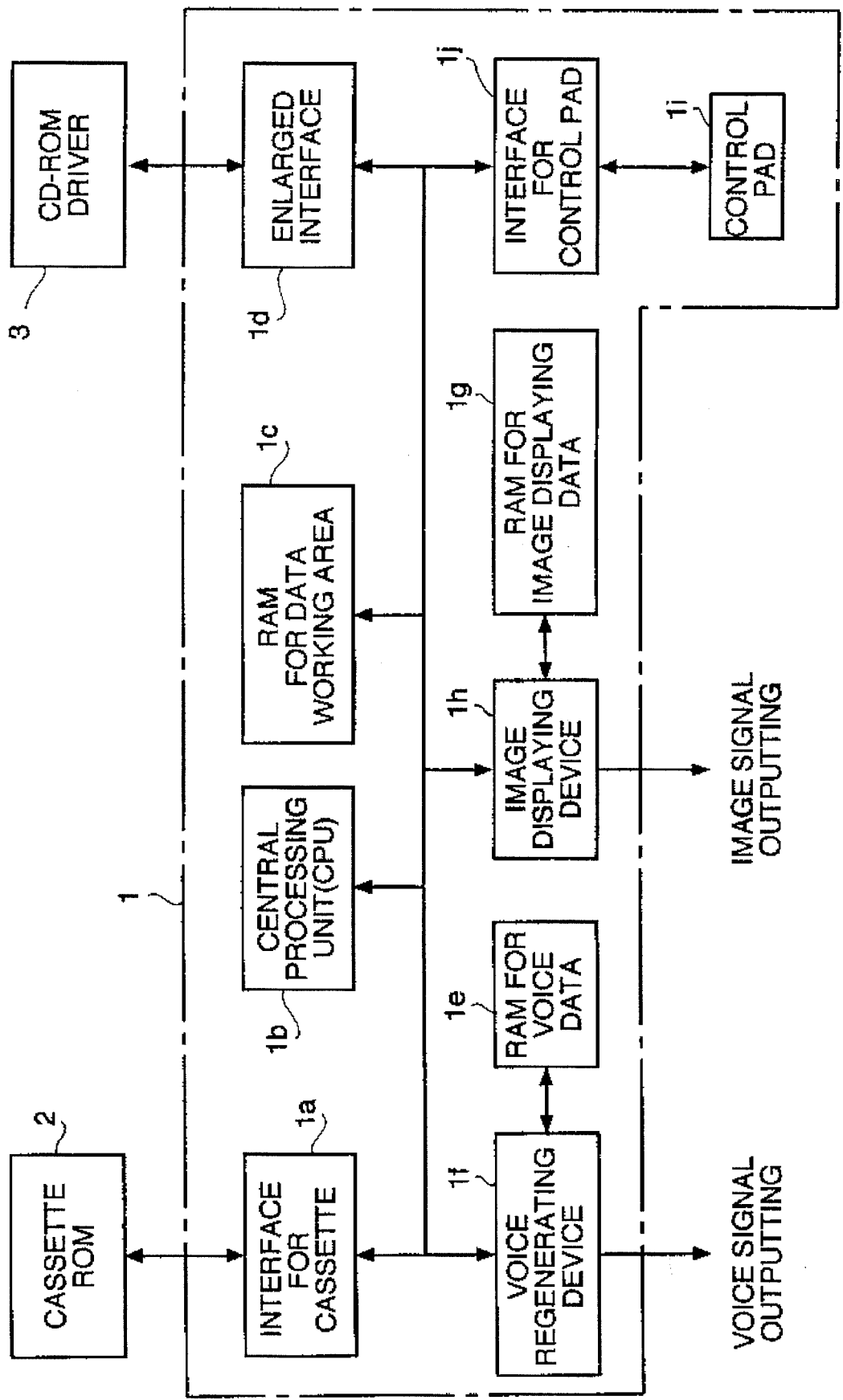
FIG. 1 is a block diagram showing a construction of a conventional video gaming device.
Figure 2:
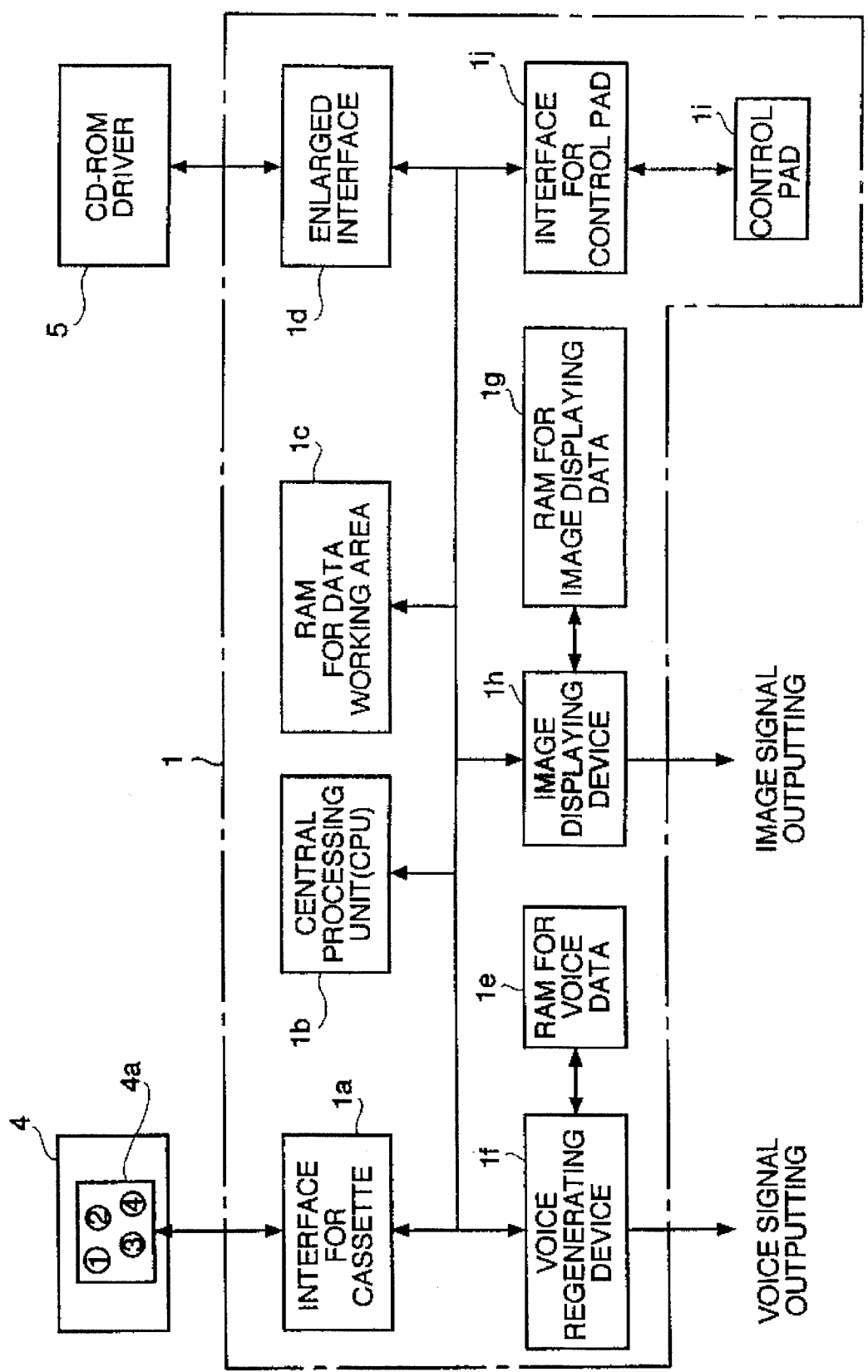
FIG. 2 is a block diagram showing a construction of the photographic data regenerating method applied to the first embodiment of this invention.

The first embodiment adapted for this invention is described in detail with reference to the drawing. FIG. 2 is a block diagram showing a construction of said first embodiment. In this figure, same or equivalent parts corresponding to FIG. 1 are given the same reference numbers and the explanations thereof are eliminated.

In FIG. 2, the numeral 4 identifies a cassette ROM, and in a ROM area 4a in said cassette ROM 4, are a system controlling program (1), a CD-ROM controlling program (2), a display data-preparing program (3) enlarging photographic data compressed and stored in the optical disk, and a utility program (4) performing dealing and controlling of referring, zooming and panning operations of said photographic data which are used in performing said regenerating operation. The numeral 5 identifies a CD-ROM driver which is provided with an optical disk storing said compressed photographic data.

Next, action of the devices composing this embodiment is explained. By inputting the power supply, at first, a central processing unit (CPU) 1b reads out said system-controlling program (1) including a system start-up program, from said cassette ROM 4 through said cassette interface 1a, and performs system initialization in conformity with these programs. Then said CPU 1b reads out a utility program (4) performing dealing and controlling of referring, zooming and panning operations of said photographic data from said cassette ROM 4, and transfers the initial image data to image displaying RAM 1g, and stores said data therein. Successively, said initial image data stored in RAM 1g are converted to image signals in an image displaying device 1h, then displayed on the (not shown) image device.

Next, reference information such as data numbers of said photographic data read out from said optical disk inserted in said CD-ROM driver 5 through an enlarged interface 1*d*, then stored in RAM 1*c* acting as the working area, in conformity with said CD-ROM controlling program (2) read out from said cassette ROM 4. Then said information is transferred and stored in said image displaying RAM 1*g* and displayed on said (not shown) image device, then said CPU 1*b* waits for selective operation of key inputting from a control pad 1*i*.

When the data number of said photographic data is selected with key-inputting, in conformity with said CD-ROM controlling program (2) read out from said cassette ROM 4, said photographic data are read out from said optical disk inserted in said CD-ROM driver 5 through said enlarged interface 1*d*, and then said read-out photographic data are temporarily stored in said RAM 1*c* functioning as a working area.

Succeedingly, said display data preparing program (3) is read out from said cassette ROM 4, then, in conformity with this program (3), said RAM 1*c* functioning as a working area is applied as an enlarging zone of said compressed photographic data, said photographic data are dealt with enlarging treatment, and converted to the original photographic data.

Said photographic data enlarged and converted to the original data are successively transferred to said RAM 1*g* functioning as an image display, then read out in due order from said RAM 1*g*, converted to image signals in said image displaying device 1*c*, and displayed on the (not shown) CRT device.

As described above, in this embodiment provided with said conventional video gaming device 1 equipped with said enlarged interface 1*d*, it becomes possible to regenerate photographic data, by connecting said CD-ROM driver 5 installable with said optical disk storing said compressed photographic data to said enlarged interface 1*d*, and by connecting said cassette ROM 4 storing said system controlling program (1) including a system start-up program and said CD-ROM controlling program (2) and said display data preparing program (3) performing enlargement of said photographic data stored in said optical disk, and said utility program (4) performing dealing and controlling of referring, zooming and panning operations of said photographic data used in said enlarging operation, to said cassette interface 1*a*.

Furthermore, it may be possible to store said display data-preparing program (3) performing enlargement of said photographic data and a utility program (4) dealing and controlling of referring, zooming and panning operations of said photographic data which are used in said regenerating operation, in said optical disk insertable in said CD-ROM driver 5. In this case, after said system is initialized, at first, in conformity with said CD-ROM controlling program read out from said cassette ROM 4, said utility program (4) and said display data-preparing program (3) are read out from said CD-ROM driver 5, and stored in said Palm 1*c*, and then the displaying of said initial data begins to start.

(The second embodiment)

Figure 3:
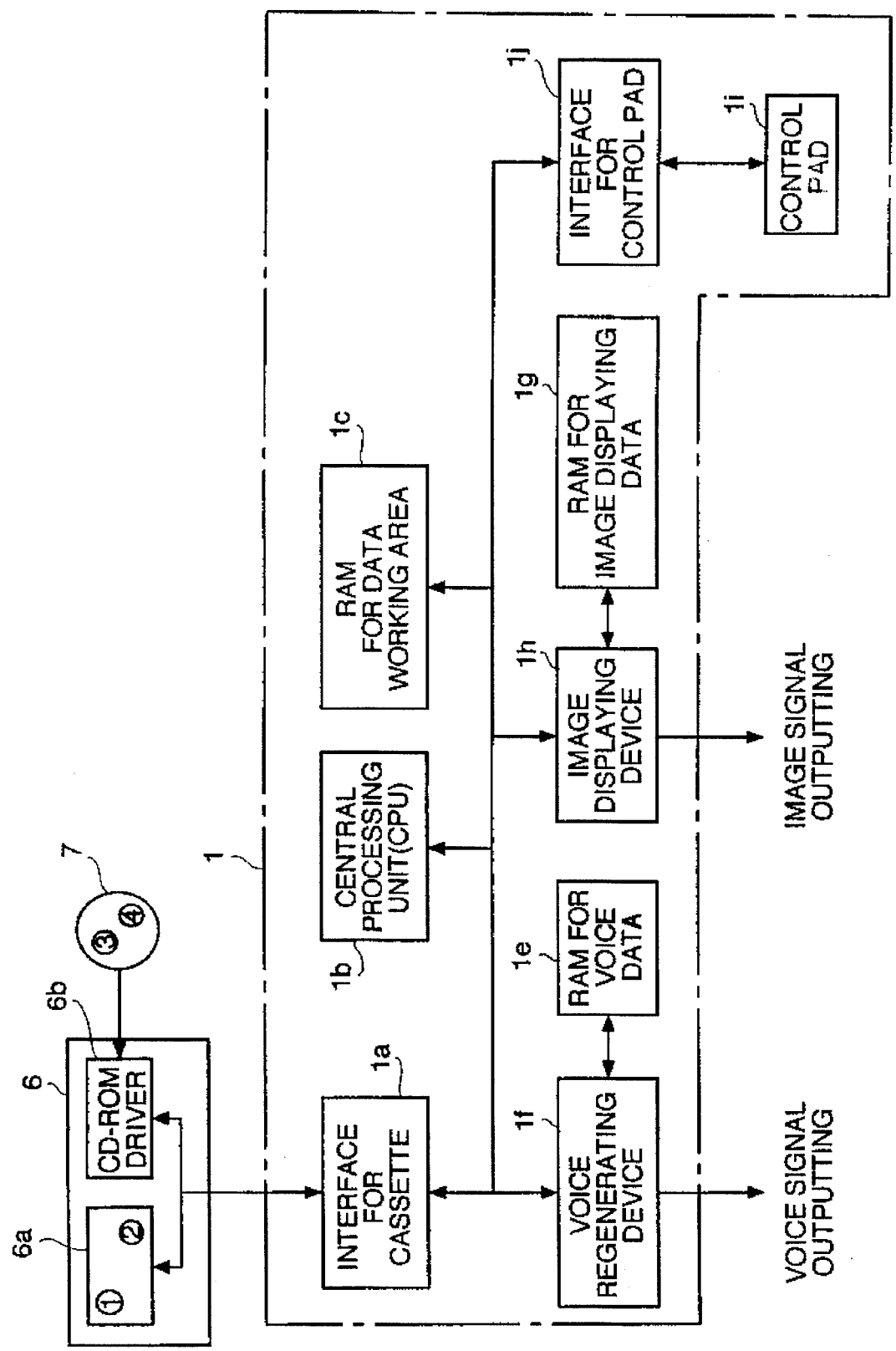
FIG. 3 is a block diagram showing a construction of the photographic data regenerating method applied to the second embodiment of this invention.

Next, the second embodiment adopted for this invention is described in detail with reference to the drawing. FIG. 3 is a block diagram showing a construction of said second embodiment. In this figure, same or equivalent parts corresponding to FIG. 1 are given the same reference numbers and the explanations thereof are eliminated. In this embodiment, a video gaming device 1 is not provided with an enlarged interface.

A cassette unit identified by the numeral 6 is provided with ROM 6*a* and CD-ROM driver 6*b*. In said ROM 6*a*, a system-controlling program (1) including a system start-up program, and a CD-ROM controlling program (2) are stored therein. In said CD-ROM driver 6*b*, an optical disk storing compressed photographic data is inserted. In said optical disk 7, a display data-preparing program (3) enlarging said photographic data, and a utility program (4) performing dealing and controlling of referring, zooming and panning operations of said photographic data used for regenerating are stored therein.

Next, the action of the devices composing this embodiment is explained. By inputting the power supply, at first a central processing unit (CPU) 1*b* reads out said system controlling program (1) including said system start-up program, and said CD-ROM controlling program (2) from said ROM 6*a* of said cassette unit 6 through said cassette interface 1*a*, and successively in conformity with these programs, reads out said display data-preparing program (3) and said utility program (4) performing dealing and controlling of referring, zooming and panning operations of said photographic data used in regeneration, from said optical disk 7 inserted in said CD-ROM driver 6*b*, and stores them in said ROM 1*c* functioning as a working area. Then, in conformity with said utility program (4), displays initial image, and then in conformity with said CD-ROM controlling program (2), reads out and displays the referring information from said optical disk, and thereafter waits for key inputting from said control pad 1*i*.

Next, after said key inputting is performed, said CPU 1*b* reads out said photographic data from said optical disk 7, and temporarily stores said read-out data in said RAM 1*c* functioning as the working area. Successively, said CPU 1*b* uses said RAM 1*c* as the enlarging zone of said compressed photographic data, in conformity with said display data-preparing program (3), then enlarges said photographic data stored in said RAM 1*c*, and transforms them into original photographic data.

Said photographic data enlarged and converted in the original data are transferred and stored in said RAM 1*g* storing image-displaying data, and successively read out from said RAM 1*g* and converted in said image signals and displayed on the (not shown) CRT device.

As mentioned above, in this embodiment provided with said conventional video gaming device having no enlarged interface 1*d*, it is possible to regenerate said photographic data, only by connecting said cassette unit 6 having said ROM 6*a* storing said system controlling program (1) including a system startup program, and a CD-ROM driver 6*b*, to said cassette interface 1*a*.

(The third embodiment)

Figure 4:
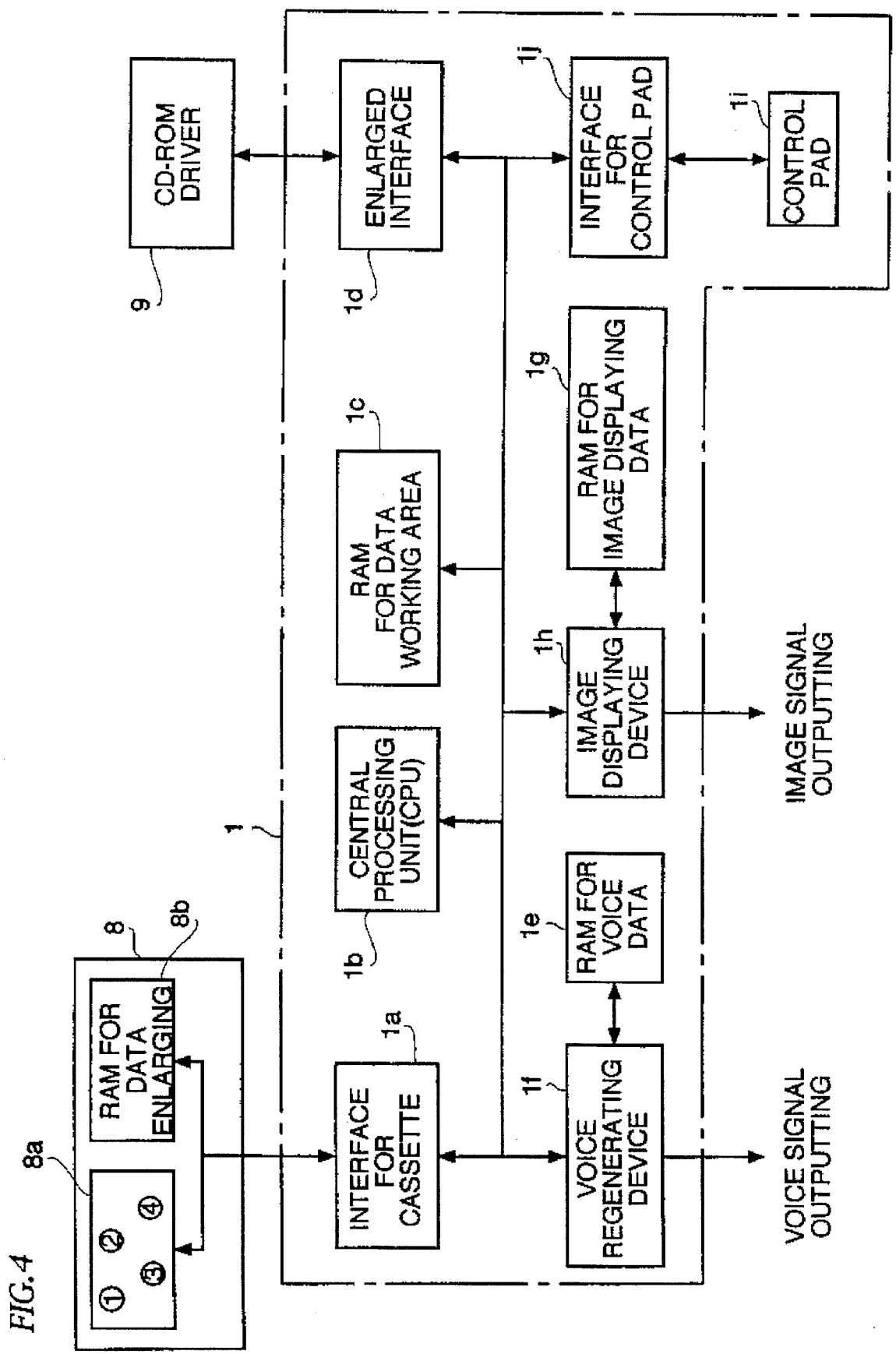
FIG. 4 is a block diagram showing a construction of the photographic data regenerating method applied to the third embodiment of this invention.

Next, the third embodiment adopting this invention is described in detail with reference to the drawing. FIG. 4 is a block diagram showing the construction of said third embodiment. In this figure, same or equivalent parts corresponding to FIG. 1 are given the same reference numbers and the explanations thereof are omitted.

A cassette unit identified by the numeral 8 is provided with ROM 8*a* and RAM 8*b* for performing enlarging. In said ROM 8*a* are stored a system-controlling program (1) and a CD-ROM controlling program (2) and a display data-preparing program (3) for enlarging photographic data stored in an optical disk as being compressed, and a utility program (4) for dealing with referring, zooming and panning of photographic data and for controlling them when performing the regenerating of said data. Said optical disk storing said photographic data so as to be compressed is inserted in a CD-ROM driver identified by the numeral 9.

Succeedingly, action of the devices composing this embodiment are explained. In this embodiment, by inputting the power supply, a central processing unit (CPU) 1b reads out, at first, said system-controlling program (1) including a system start-up program, from said ROM 8a in said cassette 8, through a cassette interface 1a, and initializes this system by applying with said program (1). Successively, said CPU 1b reads out said utility program (4) performing dealing of referring, zooming, and panning operations of said photographic data and controlling of them, from said ROM 8a, and transfers an initial image data into said RAM 1g and then stores them therein. Said initial image data are converted into image signals by said image displaying device 1h, then displayed on the (not shown) display device.

Nextly, in conformity with said CD-ROM controlling program (2) read out from said ROM 8a, referencing information such as data number and the others of said photographic data, read out from said optical disk 7 connected to said CD-ROM driver 9 through said enlarged interface 1d, are stored in said RAM 1c functioning as a working area, and succeedingly transferred to said image displaying RAM 1g and stored therein, then displayed on said display device through said image displaying device 1h, and finally this system waits for key-in from said control pad 1i. After a data number of said photographic data is selected with said key inputting, said photographic data is read out from said optical disk connected to said CD-ROM driver 9 through said interface 1d in conformity with said CD-ROM controlling program (2), and said read-out photographic data are temporarily stored in said RAM 8b enlarging said photographic data. Next, in conformity with said display data-preparing program (3) performing enlarging of said data, read out from said ROM 10a, enlarging of said photographic data stored in said RAM 8b is performed and said data are converted into original photographic data, by using said RAM 8b as the region enlarging said compressed photographic data.

Said photographic data enlarged and converted in the original data, are transferred and stored in said RAM 1g storing image-displaying data, and successively read out from said RAM 1g and then displayed on said (not shown) CRT device after being converted into the image signal within said image-displaying device 1h.

As described above, in this embodiment, by applying said conventional video gaming device 1 having an enlarged interface 1d, it becomes possible to regenerate photographic data, merely by connecting said cassette unit having ROM 8a and RAM 8b to said cassette interface 1a, and connecting said CD-ROM driver 9 providing said optical disk storing said compressed photographic data to said cassette interface 1a, wherein said ROM 8a stores said system-controlling program (1) including said system start-up program, said CD-ROM controlling program (2), said display data-preparing program (3) and said utility program (4), and said RAM 8b enlarges said compressed photographic data.

Furthermore, it may be possible to lay the construction so that said display data-preparing program (3) enlarging said photographic data and said utility program (4) for performing the dealing and controlling of referencing, zooming and panning of said photographic data which is used when regenerating said data, are stored in said optical disk connected to said CD-ROM driver 9. In this case, after this system was initialized, in conformity with said CD-ROM controlling program (2) read out from said ROM 8a, said utility program (4) and said display data-preparing program (3) are read out, then after storing them in said RAM 1c functioning as a working area, working for said initial image data displaying and the like begin to start.

(The fourth embodiment)

Figure 5:
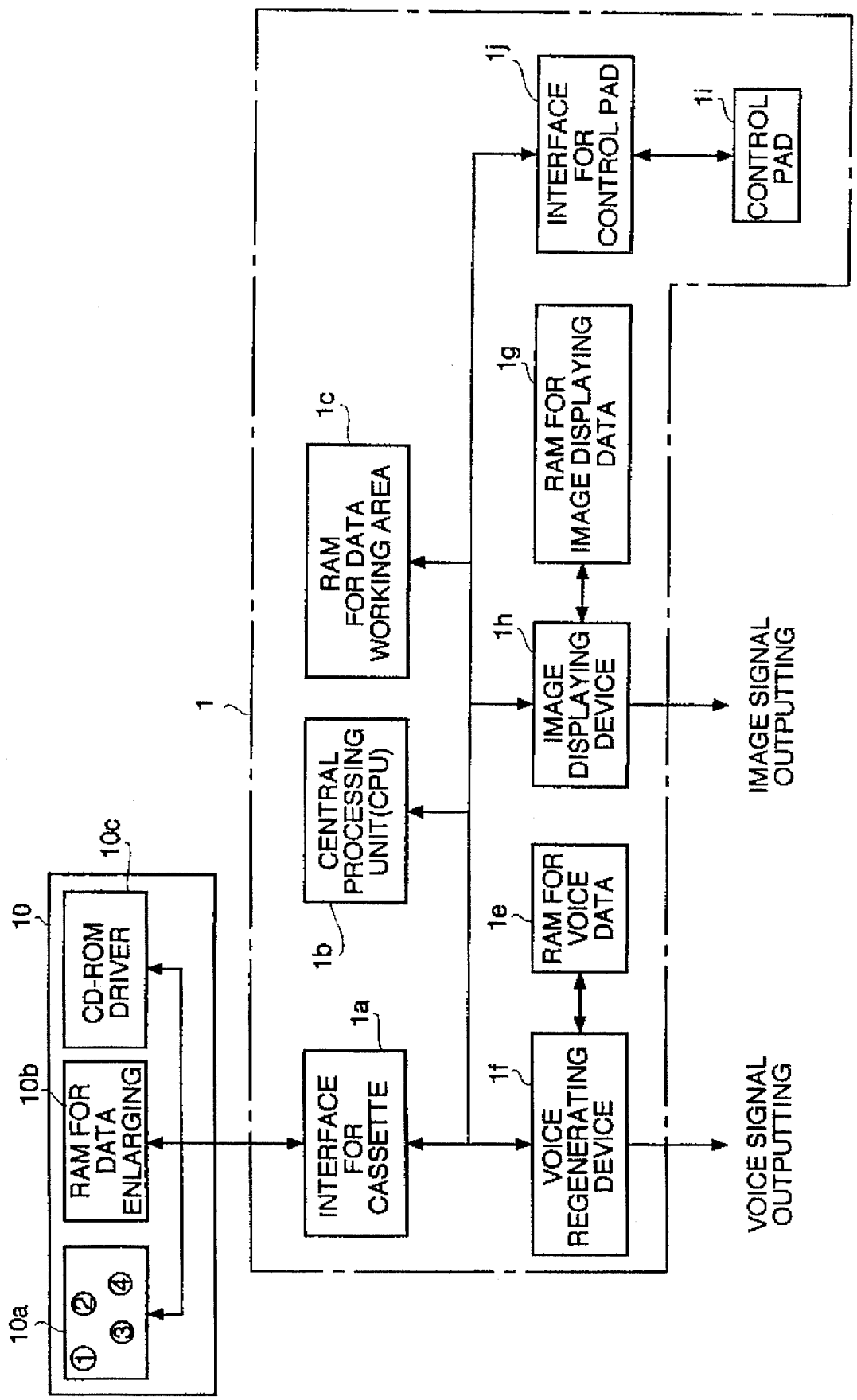
FIG. 5 is a block diagram showing a construction of the photographic data regenerating method applied to the fourth embodiment of this invention.

Next, the fourth embodiment adopting this invention is described in detail with reference to the drawing. FIG. 5 is a block diagram showing the construction of this fourth embodiment. In this figure, same or equivalent parts corresponding to FIG. 1 are given the same reference numbers and the explanations thereof are omitted. In this embodiment, said video gaming device 1 is not provided with an enlarged interface.

A cassette unit identified by the numeral 10 is provided with ROM 10a and RAM 10b for performing enlarging and a CD-ROM driver 10c. In said ROM 10a, a system-controlling program (1) including a system start-up program, a CD-ROM controlling program (2), a display data-preparing program (3) for enlarging the photographic data stored in an optical disk as being compressed, a utility program (4) performing dealing and controlling of referring, zooming and panning operations of photographic data are stored therein. Also, in said CD-ROM driver 10c, said optical disk storing said compressed photographic data is inserted therein.

Succeedingly, action of the devices composing this embodiment is explained as follows. In this embodiment, by inputting the power supply, a central processing unit (CPU) 1b initially reads out said system-controlling program (1) including a system start-up program through said cassette interface 1a from said ROM 10a in said cassette unit 10, initializes said system by applying said program (1). Succeedingly, said CPU 1b reads out said utility program (4) performing dealing and controlling of said photographic data, from said ROM 10a, and transfers said initial image data into said image display RAM 1g and lets them be stored therein. Said initial image data stored in said image display RAM 1g are converted into image signals in said image display device 1h and displayed on said (not shown) image device.

Next, in conformity with said CD-ROM controlling program (2) read out from said ROM 1a, referencing information, such as data number of said photographic data read out from said optical disk 7 inserted in said CD-ROM driver 10c, are then transferred and stored in said RAM 1g, then displayed on the displaying device through said image-displaying device 1h, and then said CPU 1b waits for key-inputting from said control pad 1i for selecting said data number. When said data number of said photographic data is selected by key-inputting, said photographic data are read out from said optical disk connected to said CD-ROM driver 10c through said cassette interface 1a in conformity with said CD-ROM controlling program read out from said ROM 10a, said read-out photographic data are temporarily stored in said RAM 10b. Said CPU 1b reads out said display data-preparing program (3) from said ROM 10a, in conformity with said program (3), by using said RAM 10b prepared for enlarging said photographic data as the enlarging region, enlarges said photographic data stored in said RAM 10b, and converts said data into original photographic data.

Said photographic data enlarged and converted into original data, are transferred to said image displaying RAM 1g and stored therein, succeedingly read out in order, and after being converted into image signals in said display device 1h, displayed on the (not shown) CRT device.

As described above, in this embodiment, by applying a conventional video gaming device 1 having no enlarged interface 1d, it becomes possible to regenerate photographic data, simply by connecting said cassette unit 10 having ROM 10a and RAM 10b and said CD-ROM driver 10c with said cassette interface 1a, wherein said ROM 10a stores a system-controlling program (1) including a system start-up program, a CD-ROM controlling program (2), a display data preparing program (3) and a utility program (4).

Furthermore, it may be possible to lay the construction so that said display data-preparing program (3) enlarging said photographic data, and said utility program (4) performing the dealing and controlling of referring, zooming and panning operations of said photographic data which is used in regenerating said data, are stored in said optical disk connected to said CD-ROM driver 10c. In this case, after this system was initialized, in conformity with said CD-ROM controlling program (2) read out from said ROM 10a, said utility program (4) and said display data preparing program (3) are read out, then, after storing them in said working area RAM 1c, dealing of said initial image displaying starts.

(The fifth embodiment)

Figure 6:
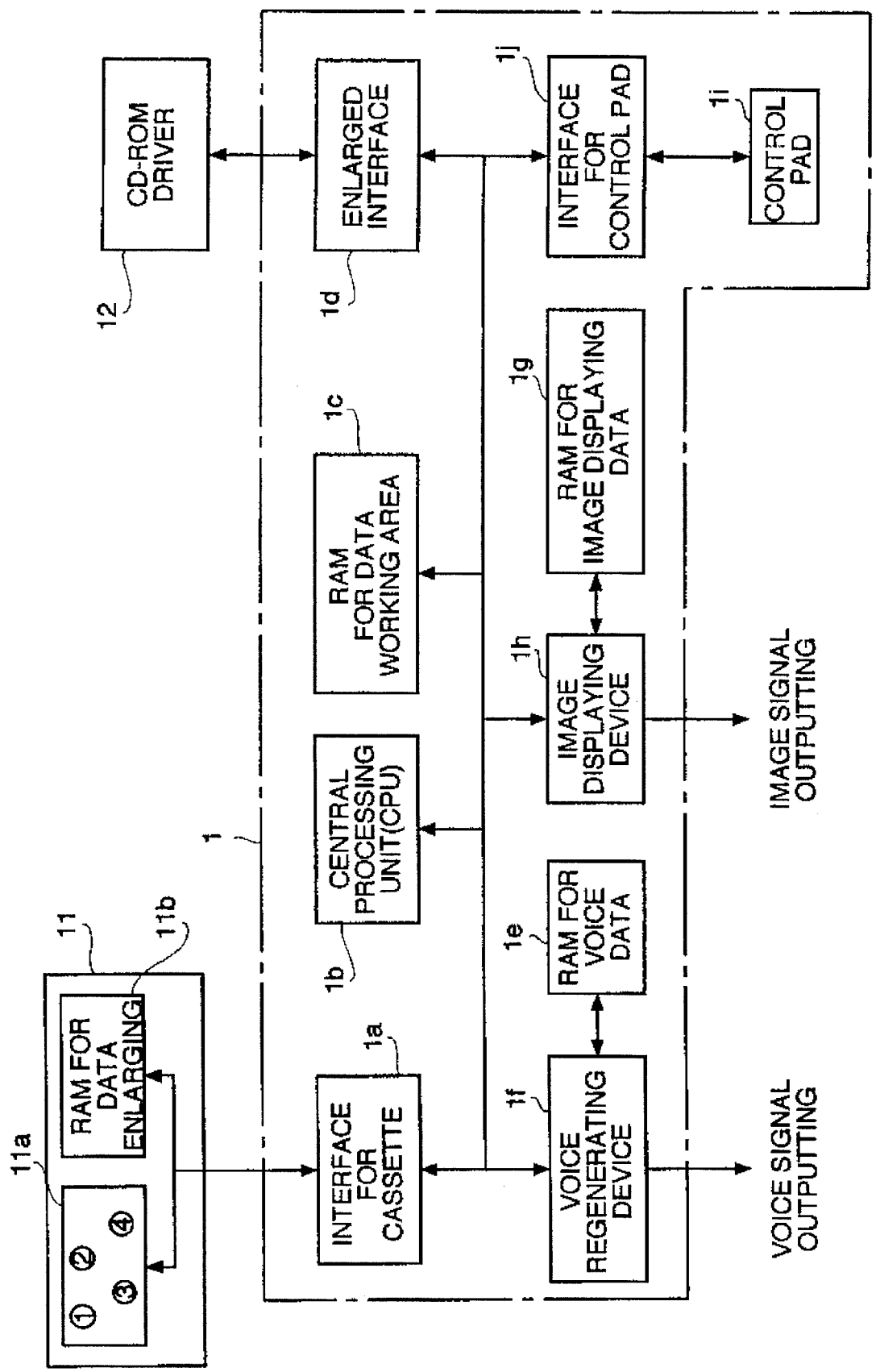
FIG. 6 is a block diagram showing a construction of the photographic data regenerating method applied to the fifth embodiment of this invention.

Next, the fifth embodiment adopting this invention is described in detail with reference to the drawing. FIG. 6 is a block diagram showing the construction of this fifth embodiment. In this figure, same or equivalent parts corresponding to FIG. 1 are given the same reference numbers and the explanations thereof are omitted.

A cassette unit identified by the numeral 11 is provided with ROM 11a and a data enlarging device 11b composed with exclusive integral circuits and the others.

In said ROM 11a are stored a system-controlling program (1) including a system start-up program, a CD-ROM controlling program (2), a display data-preparing program (3) and a utility program (4) performing dealing and controlling of referring, zooming and panning operations of said photographic data in regeneration. An optical disk storing said photographic data as being compressed is inserted in a CD-ROM driver identified by the numeral 12.

Next, action of the device composing this embodiment is explained as follows. In this embodiment, by inputting the power supply, a central processing unit (CPU) 1b at first reads out said system-controlling program (1) including a system start-up program, from said ROM 11a in said cassette unit 11 through said cassette interface 11a, and initializes this system in conformity with said program (1). Successively, said CPU 1b reads out said utility program (4) performing dealing and controlling of referring, zooming and panning operations of photographic data from said ROM 11a, and transfers initial image data into image displaying RAM 1g and lets them be stored therein. Said initial image data stored in said image displaying RAM 1g are converted to image signals in an image display device 1h and thereafter displayed on the (not shown) image device.

Nextly, in conformity with said CD-ROM controlling program (2) read out from said ROM 11a, referring information such as data numbers and the others of photographic data read out from said optical disk inserted in said CD-ROM driver 12 through said enlarged interface 1d are stored in RAM 1c playing as a working area, then transferred to said image displaying RAM 1g and stored therein, then displayed on said image device, and wait for the key-in from a control pad 1i. After data numbers of photographic data are selected by said key-in input, said CPU 1b reads out said photographic data from said optical disk inserted in said CD-ROM driver 12 through said enlarged interface 1d in conformity with said CD-ROM controlling program (2) read out from said ROM 11a, then transfers said read-out photographic data onto said data-enlarging device 11b. Successively, said CPU 1b reads out said display data preparing program (3) from said ROM 11a, and in conformity with this program, enlarges said read-out photographic data, and converts it to original photographic data.

Said photographic data are enlarged and converted to original data, then transferred to said image displaying RAM 1g and stored therein. Furthermore, said data are read out in order from said image displaying RAM 1g, and are converted into image signals in said image displaying device 1h, and lastly displayed on the (not shown) CRT device.

As described above, in this embodiment, by applying said conventional video gaming device 1 having said enlarged interface 1d, and by connecting said cassette unit having said ROM 11a and said data enlarging device 11b to said cassette interface 1a, and by connecting said CD-ROM driver 12 capable of receiving said optical disk storing said photographic data as being compressed, to said enlarged interface 1d, it becomes possible to regenerate said photographic data. Also, as said data enlarging device 11b is composed of exclusive integral circuits and the others, it is possible to increase the data enlarging speed and furthermore to maintain the effects not easily copied. In this case, it is a matter of course that said ROM 11a stores a system-controlling program (1) including a system start-up program, a CD-ROM controlling program (2), a data-enlarging device controlling program (3) and a utility program (4).

Furthermore, it may be possible to compose this system, so as to store said data enlarging device controlling program (3) and said utility program (4) performing dealing and controlling of the referring, zooming and panning operations of photographic data used in regenerating, in said optical disk connected to said CD-ROM driver 12. In this case, after the system is initialized, at first, by applying said CD-ROM controlling program (2) read out from said ROM 11a, read out said utility program (4) and said data enlarging device controlling program (3) from said CD-ROM driver 12, dealing of said initial image data displaying and the others are performed after being stored in said working area RAM 1c.

(The sixth embodiment)

Figure 7:
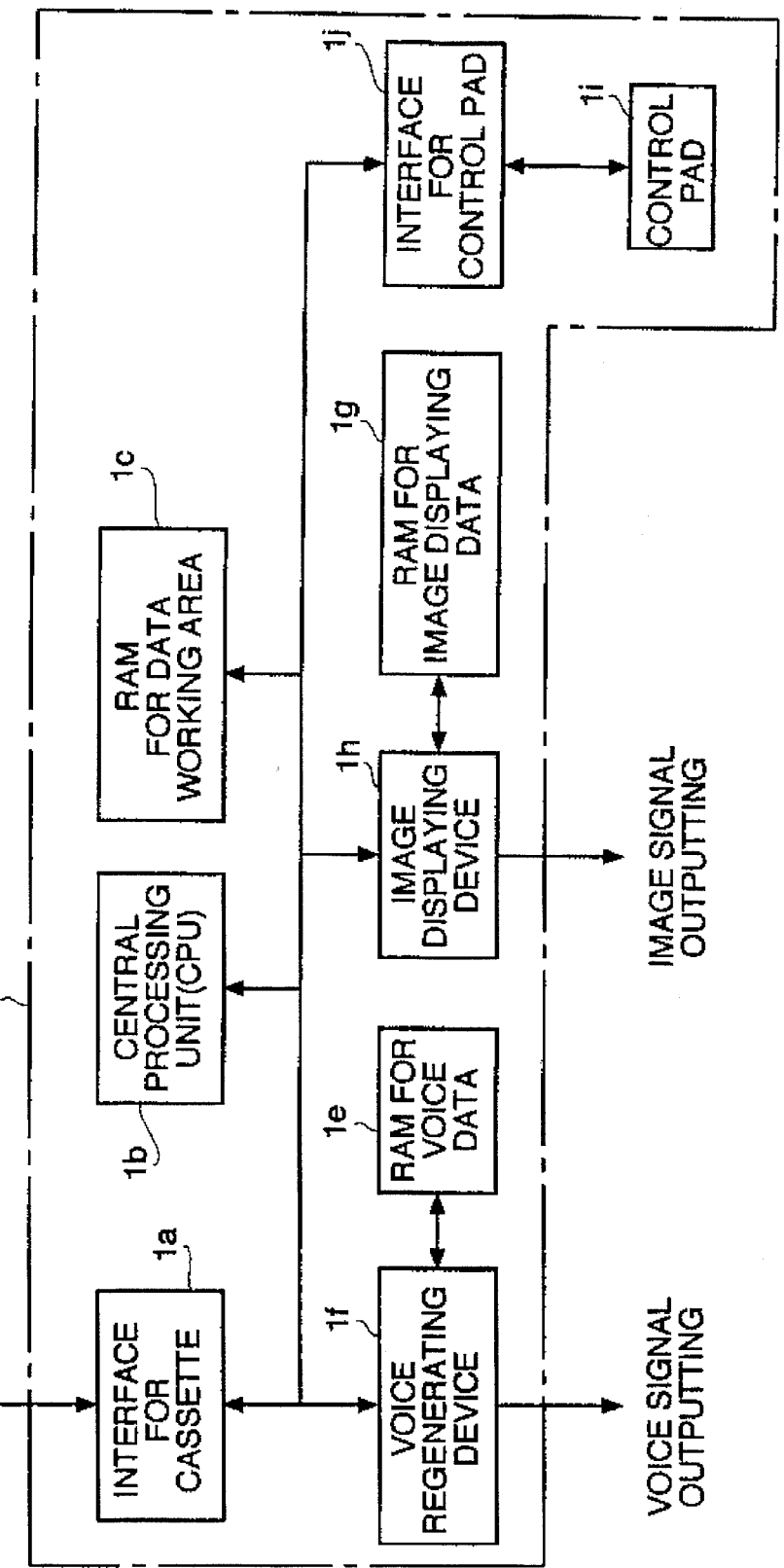
FIG. 7 is a block diagram showing a construction of the photographic data regenerating method applied to the sixth embodiment of this invention.

Next, the sixth embodiment adopting this invention is described in detail with reference to the drawing. FIG. 7 is a block diagram showing the construction of this sixth embodiment. In this figure, same or equivalent parts corresponding to FIG. 1 are given the same referring numbers and the explanations thereof are omitted. In this embodiment, said video gaming device 1 is not provided with an enlarged interface.

A cassette unit identified by the numeral 13 is provided with ROM 13a, a data enlarging device 13b and a CD-ROM driver 13c. In said ROM 13a, a system controlling program (1) including a system start-up program, a CD-ROM controlling program (2), a data enlarging device controlling program (3) and a utility program (4) performing dealing and controlling of the referring, zooming and panning actions of said photographic data are stored therein. An optical disk storing said photographic data as being compressed, is inserted in said CD-ROM driver identified by the numeral 13c.

In this embodiment, said conventional video gaming device 1 having no enlarged interface 1d is provided. It is possible to regenerate said photographic data simply by connecting said gaming device to said cassette unit 13 having said ROM 13a storing a system-controlling program (1) enclosing a system start-up program, a CD-ROM controlling program (2), a data enlarging device controlling program (3) and said utility program (4), and a data enlarging device 13b and said CD-ROM driver 13c insertable into said optical disk storing compressed photographic data through said cassette interface 1a.

Also, as said data enlarging device 13b is composed with exclusive integral circuits, it is possible to increase the operating speed of enlargement and to have a property not easily copied.

Furthermore, it may be possible to compose this system, so as to store said data enlarging device controlling program (3) and said utility program (4) performing the dealing and controlling of the referring, zooming and panning actions of photographic data which are usable in case of regeneration in said optical disk inserted into said CD-ROM driver 13c.

(The seventh embodiment)

Figure 8:
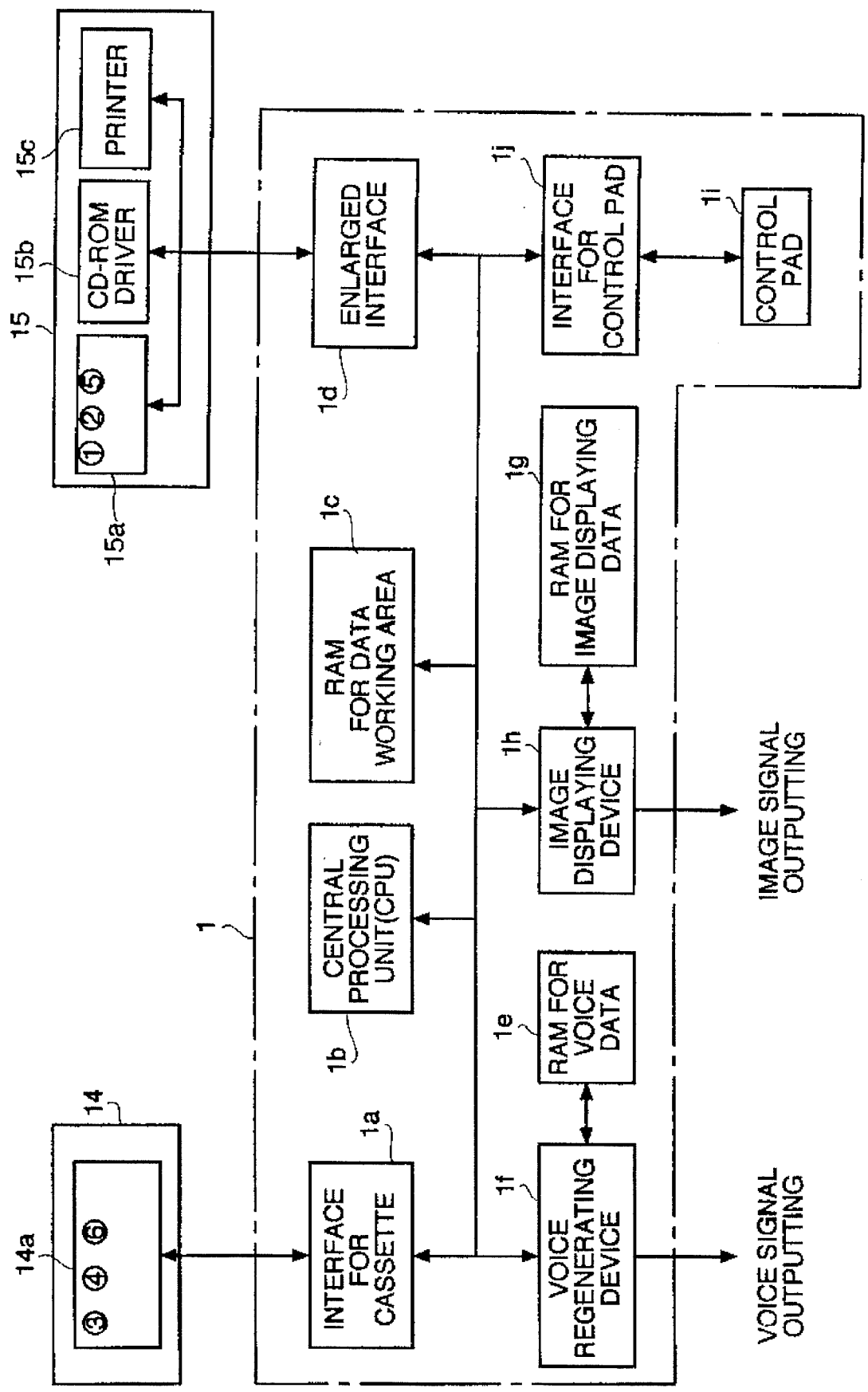
FIG. 8 is a block diagram showing a construction of the photographic data regenerating method applied to the seventh embodiment of this invention.

Next, the seventh embodiment adopting this invention is described in detail with reference to the drawing. FIG. 8 is a block diagram showing the construction of this seventh embodiment. In this figure, same or equivalent parts corresponding to FIG. 1 are given the same reference numbers and explanations thereof are omitted.

A cassette ROM identified by the numeral 14 is provided for the first ROM area 14a. In said first ROM area 14a, a display data-preparing program (3) performing enlarging of photographic data compressed and stored in an optical disk, a utility program (4) performing dealing and controlling of referring, zooming and panning operations of said photographic data used in data regeneration, and a print-out data dealing program (6) are stored therein. An externally connectable unit identified by the numeric 15 is provided for a second ROM area 15a, a CD-ROM driver 15b and a printer 15c. In said secondary ROM area 15a, a system controlling program (1) including a system start-up program, a CD-ROM controlling program (2) and a printer-controlling program (5) are stored therein. In said CD-ROM driver 15b, an optical disk storing said compressed photographic data is inserted. Said printer 15c prints out said photographic data stored in said optical disk.

Next, action of the devices composing this embodiment are explained as follows. In this embodiment, by inputting the power supply, at first, a central processing unit (CPU) 1b reads out said system controlling program (1) including a system start-up program from said ROM area 15a, and initializes this system by applying said program (1). Successively, said CPU 1b reads out said utility program (4) performing dealing and controlling referring, zooming and panning operations of said photographic data from said ROM area 14a, then transfers an initial image data into said image displaying RAM 1g and lets them be stored therein. Said initial image data stored in said image displaying RAM 1g are converted in image signals in an image displaying device 1h, and said images are displayed on the (not shown) image device.

Next, in conformity with said CD-ROM controlling program (2) read out from said ROM area 15a, said CPU 1b reads out the referencing information of said photographic data. Said information such as data numbers of said read-out photographic data are stored in said RAM 1c functioning as a working area, then they are transferred into said image displaying RAM 1g and stored therein, and after being displayed on the image device through said image displaying device 1h, this system waits for key-in from a control pad 1i. After said data number of said photographic data is selected by said key-in, said CPU 1b reads out said photographic data from said optical disk through said enlarged interface 1d in conformity with said CD-ROM controlling program (2) read out from said ROM area 15a, then temporarily stores said read-out photographic data in said RAM 1c acting as the working area. Then said CPU 1b reads out said display data-preparing program (3) performing enlarging of said photographic data from said ROM area 14a, and in conformity with said program (3) and by using said RAM 1c as the enlarging space of said photographic data, enlarges said photographic data stored in said RAM 1c, and converts said data in the original photographic data.

Said photographic data enlarged and converted in the original data are transferred to said image displaying RAM 1g and stored therein, successively, read out in turn from said image displaying RAM 1g, after conversion into image signals in said image displaying device 1h, displayed on the (not shown) CRT device.

On the other hand, by receiving said key-in command directing to print out said data from said control pad 1i, said CPU 1b lets said printer print out said data in conformity with said command. Referring to this printing out, said CPU 1b sends said photographic data stored in said optical disk connected to said CD-ROM driver 15b to said RAM 1c having a working area, successively by applying said print out data-dealing program (6) stored in said first ROM area 14a, performs an enlarging operation of said photographic data stored in said RAM 1c, and converts said data into photographic data for printing out. Next, said CPU 1b lets said printer 15c start, by applying said printer controlling program (5) stored in said secondary ROM area 15a, and while controlling said printer 15c, transfers said photographic data stored in said RAM 1c into said printer 15c, and prints out said photographic data from said printer 15c.

As described above, a conventional video gaming device 1 having said enlarged interface 1d is provided in this embodiment. By connecting said cassette ROM 14 storing a display data preparing program (3) and utility program (4) and a print out data-dealing program (6) in said first ROM area 14a, to said cassette interface 1a, and further by connecting said externally connectable unit 15 having said secondary ROM area 15a storing said system controlling program (1) and said CD-ROM controlling program (2) and said printer controlling program (5), and said CD-ROM driver 15b and said printer 15c, to said enlarged interface 1d, it becomes possible to regenerate said photographic data, and to print out said data from said printer 15c.

(The eighth embodiment)

Figure 9:
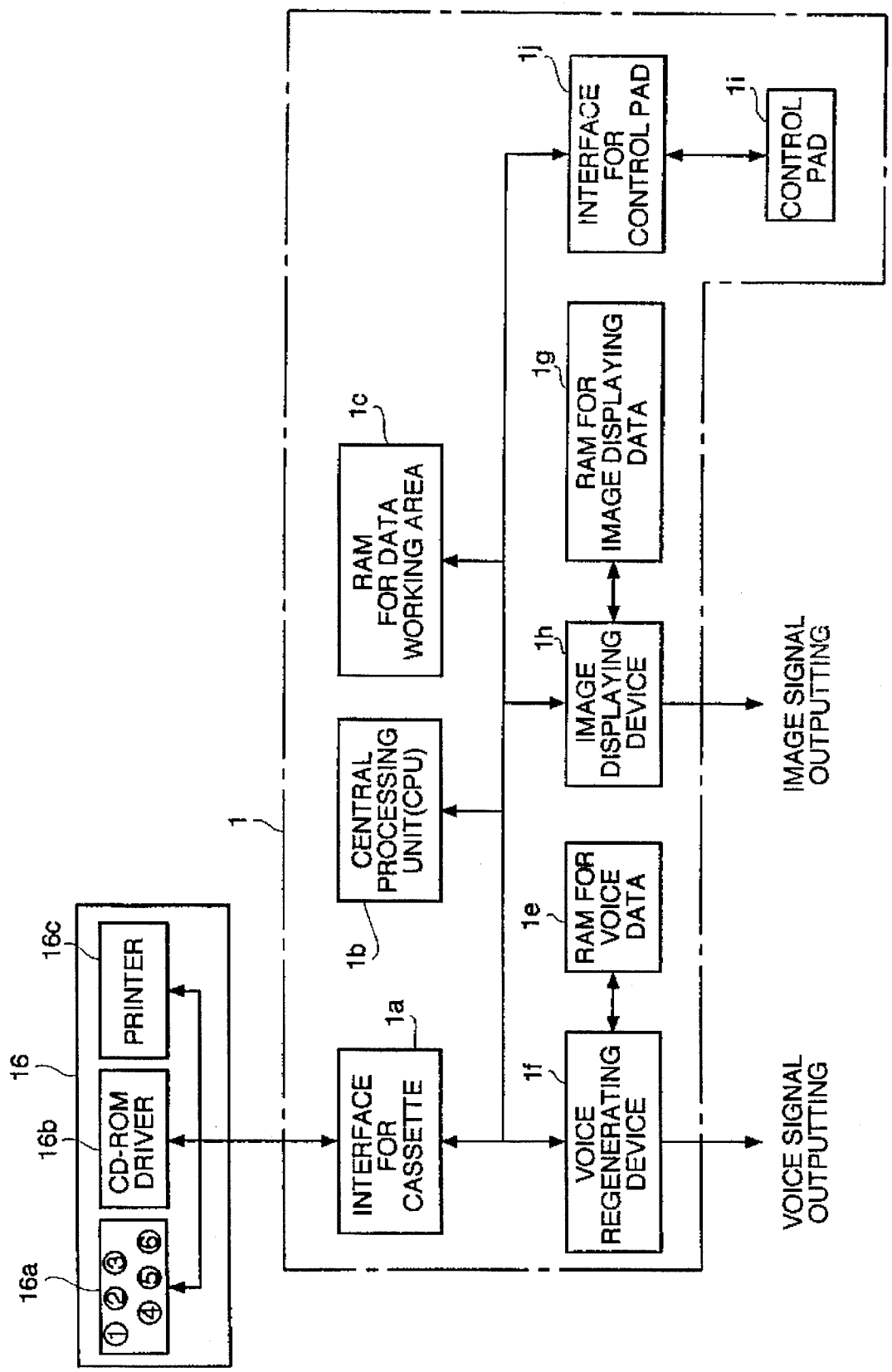
FIG. 9 is a block diagram showing a construction of the photographic data regenerating method applied to the eighth embodiment of this invention.

Next, the eighth embodiment adopting this invention is described in detail with reference to the drawing. FIG. 9 is a block diagram showing the construction of this eighth embodiment. In this figure, same or equivalent parts corresponding to FIG. 1 are given the same reference numbers and the explanations thereof are omitted. This video gaming device 1 is not provided with the enlarged interface 1d.

A cassette unit identified by the numeric 16 is provided with ROM 16a and a CD-ROM driver 16b and a printer 16c. In said ROM 16a are stored a system-controlling program (1) including a system start-up program, a CD-ROM controlling program (2), a display data-preparing program (3) performing enlarging of photographic data stored in an optical disk so as being compressed, a utility program (4) performing dealing and controlling of referring, zooming and panning operations of said photographic data in regenerating, a printer-controlling program (5) and a print-out data dealing program (6). Said CD-ROM driver 16b is provided with an optical disk storing photographic data and voice data as being compressed. Furthermore, said printer 16c prints out said photographic data stored in said optical disk.

In this embodiment provided with said conventional video gaming device having no enlarged interface 1d, simply by connecting said cassette unit 16 having said ROM 16a storing a system controlling program (1), said CD-ROM controlling program (2), said display data preparing program (3), said utility program (4), said printer controlling program (5) and said print out data dealing program (6), and said CD-ROM driver 16b and said printer 16c, to said cassette interface 1a, it becomes possible to regenerate said photographic data and said voice data, and to print out said photographic data from said printer 15c.

Furthermore, it may be possible to let said display data-preparing program (3) performing the enlargement of said photographic data compressed and stored in said optical disk and said utility program (4) used in regeneration and performing the referring, zooming and panning operations of said photographic data, store in said optical disk inserted in said CD-ROM driver 16b.

(The ninth embodiment)

Figure 10:
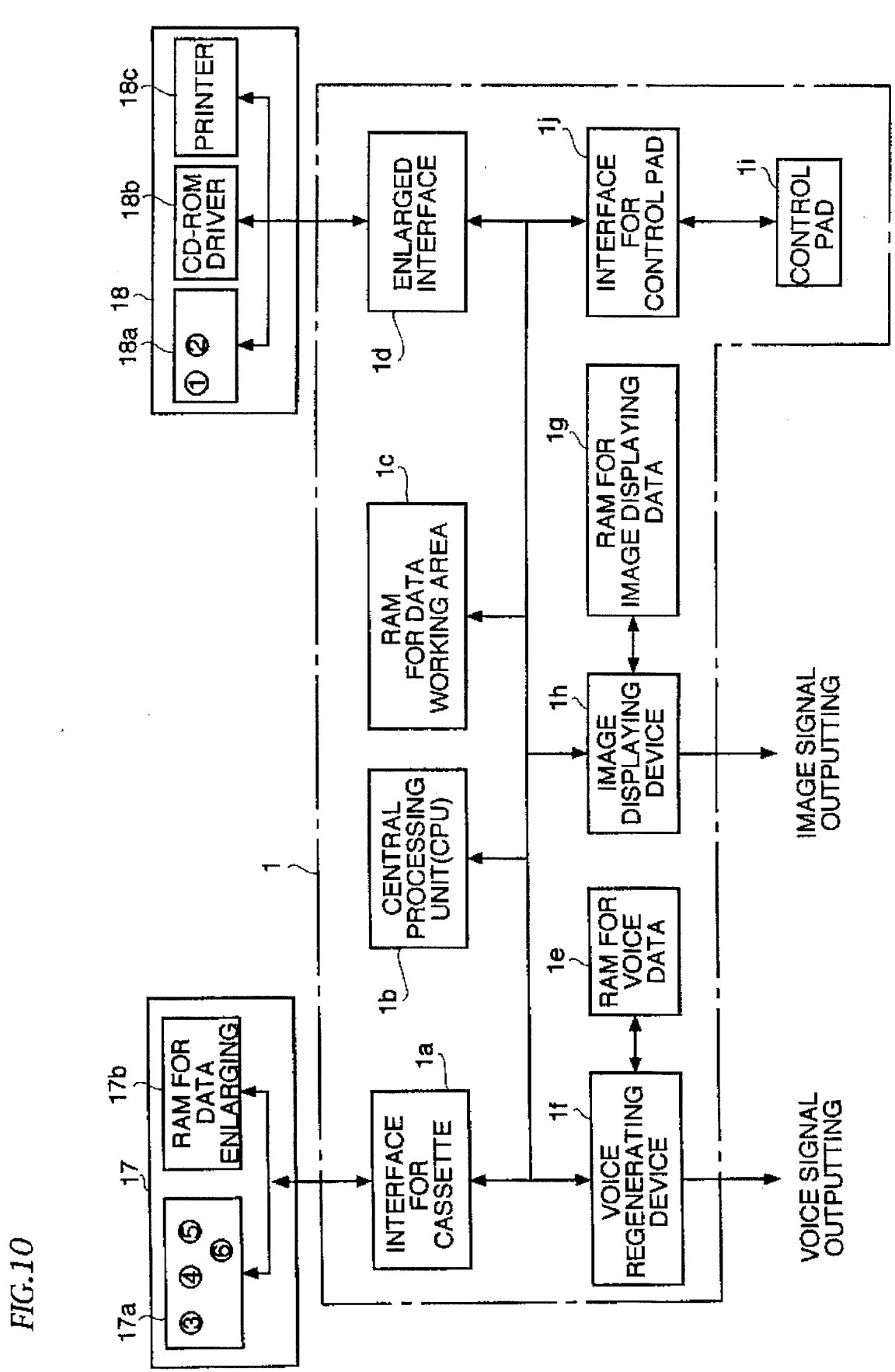
FIG. 10 is a block diagram showing a construction of the photographic data regenerating method applied to the ninth embodiment of this invention.

Next, the ninth embodiment adopting this invention is described in detail with reference to the drawing. FIG. 10 is a block diagram showing the construction of this ninth embodiment. In this figure, same or equivalent parts corresponding to FIG. 1 are given the same reference numbers, and the explanations thereof are omitted.

A cassette unit identified by the numeral 17 is provided with a first ROM area 17a and RAM 17b performing enlarging operation of photographic data. In said first ROM area 17a are stored a display data-preparing program (3) enlarging said photographic data compressed and stored in an optical disk, a utility program (4) applied for regenerating operation, performing dealing and controlling of referring, zooming and panning operations of photographic data, a printer-controlling program (5) and a print-out data dealing program (6). An externally connectable unit identified by the numeral 18 is provided with a secondary ROM area 18a, a CD-ROM driver 18b and a printer 18c.

In said secondary ROM area 18a, a system controlling program (1) including a system start-up program, and a CD-ROM controlling program (2) are stored. In said CD-ROM driver 18b, an optical disk having compressed and stored photographic data is inserted. Said printer 18c prints out said photographic data stored in said optical disk.

Next, action of said devices composing this embodiment is explained. In said embodiment, by inputting the power sources, a central processing unit 1b, at first, reads out said system-controlling program (1) including a system start-up program, and initializes said system in conformity with said program (1). Successively, said CPU 1b reads out said utility program (4) performing the dealing and controlling of referring, zooming and panning operations of said photographic data, from said ROM area 17a, then transfers said initial image data to said image displaying RAM 1g and stores them therein. Said initial image data stored in said image displaying RAM 1g are converted into image signals in an image displaying device 1h, and finally displays said data on the (not shown) image device. Next, with said CD-ROM controlling program read out from said ROM area 18a, said referring information such as data numbers of said photographic data read out from said optical disk inserted in said CD-ROM driver 18b through said enlarged interface 1d are stored in said RAM 1c functioning as working area, then said data are transferred to said image displaying RAM 1g and stored therein, further displayed on the image device through said image displaying device 1h, and thereafter said CPU 1b waits for key-inputting from a control pad 1i. After the data number of said photographic data is selected by said key-inputting, in conformity with said CD-ROM controlling program (2) read out from said ROM area 18a, said CPU 1b reads out said photographic data from said optical disk inserted in said CD-ROM driver 18b, through said enlarged interface 1d, and temporarily store said data in said RAM 17b performing the enlarging.

Successively, said CPU 1b reads out said display data-preparing program (3) enlarging said photographic data from said ROM area 17a, and then in conformity with this program (3), by using said RAM 17b as enlarging space for said compressed photographic data, enlarges said photographic data stored in said RAM 17b, and converts said data to the original photographic data.

Said photographic data enlarged and converted in original data are transferred to said image-displaying RAM 1 and stored therein, then said data are read out in order from said image-displaying RAM 1g, then, after being converted into image signals, displayed on the (not shown) CRT device.

On the other hand, after receiving the key-in command to print out said photographic data from said control pad 1i, said CPU 1b prints out by applying this command. In this printing-out operation, said CPU 1b sends said photographic data stored in said optical disk inserted in said CD-ROM driver 18b, to said RAM 17b, then, by applying said print-out data dealing program (6) stored in said first ROM area 17a, enlarges said photographic data stored in said RAM 17b, converting them to photographic data for printing out. Successively, said CPU 1b lets said printer 18c start up by applying said printer controlling program (5) stored in said primary ROM area 17a, and, while controlling said printer 18c, transfers said photographic data for printing out to said printer 18c, and lets said printer 18c print out said photographic data.

As described above, a conventional video gaming device 1 having said enlarged interface 1d is provided in this embodiment. By connecting said cassette ROM 17 having said first ROM area 17a storing said display data preparing program (3) and said utility program (4) and said printer controlling program (5) and said print-out data dealing program (6) to said cassette interface 1a, and furthermore with connecting said external connectable unit 18 having said secondary ROM area 18a storing said system-controlling program (1) and said CD-ROM controlling program (2), and said CD-ROM driver 18b and said printer 18c, to said enlarged interface 1d, it becomes possible to regenerate said photographic data, and to print out said data from said printer 18c.

(The tenth embodiment)

Figure 11:
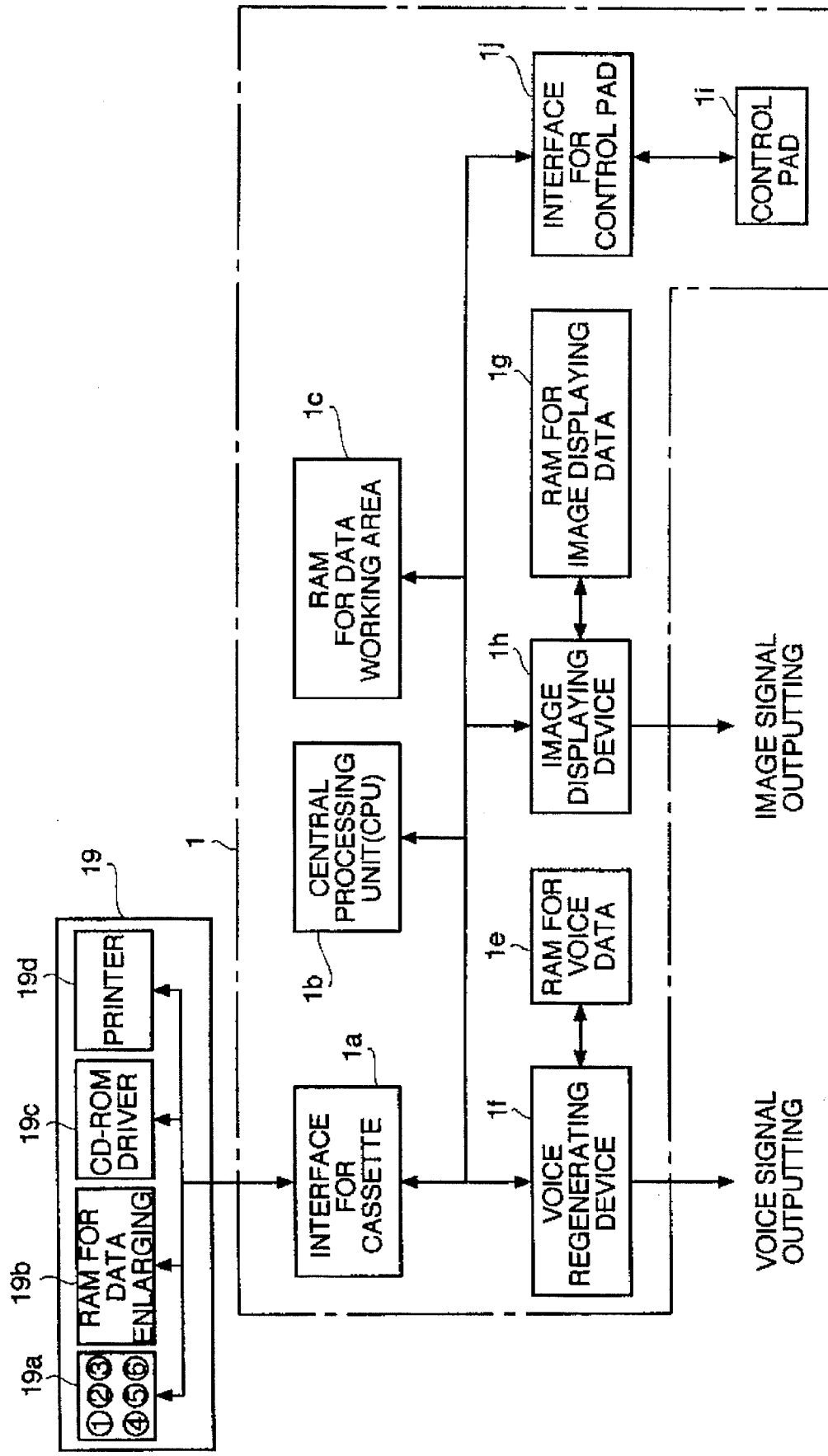
FIG. 11 is a block diagram showing a construction of the photographic data regenerating method applied to the tenth embodiment of this invention.

Next, the tenth embodiment adopting this invention is described in detail with reference to the drawing. FIG. 11 is a block diagram showing the construction of this embodiment. In this figure, same or equivalent parts corresponding to FIG. 1 are given the same reference numbers and the explanations thereof are omitted. The video gaming device 1 applied in this embodiment is not provided with an enlarged interface.

A cassette unit identified by the numeral 19 is provided with ROM 19a and RAM 19b enlarging said photographic data and a CD-ROM driver 19c and a printer 19d. In said ROM 19a are stored a system-controlling program (1) including a system start-up program, a CD-ROM controlling program (2), a display data preparing program (3) enlarging said photographic data compressed and stored in an optical disk, a utility program (4) used in the regenerating operation of said photographic data, performing of dealing and controlling of referring, zooming and panning operations of said photographic data, a printer controlling program (5) and a print-out-data dealing program (6).

In said CD-ROM driver 19*c*, said optical disk storing said photographic data as being compressed is inserted. Said printer 19*d* prints out said photographic data stored in said optical disk.

In this embodiment provided with said conventional video gaming device 1 having no enlarged interface 1*d*, by simply connecting said cassette unit 19 having said ROM 19*a* storing said system-controlling program (1), said CD-ROM controlling program (2), said display-data preparing program (3), said utility program (4), said printer-controlling program (5) and said print-out-data dealing program (6), and said CD-ROM driver 19*c* and said printer 19*d*, to said cassette interface 1*a*, it becomes possible to regenerate said photographic data and said voice data, and to print out said photographic data from said printer 19*d*.

Furthermore, it may be possible to let said display data-preparing program (3) enlarging said photographic data compressed and stored in said optical disk, and said utility program (4) used in the regenerating operation and performing dealing and controlling of the referring, zooming and panning operations of said photographic data, store in said optical disk inserted in said CD-ROM driver 19*b*.

In conclusion, by availing this invention, it becomes possible to regenerate said photographic data simply by appending a few external devices to a conventional video gaming device which is at present popularly available, as described in detail in the embodiments. There is no need to apply the exclusive regenerating device.

What we claim is:

1. A method of reading out and regenerating compressed photographic data stored in an optical disk from a CD-player video gaming apparatus having an interface connectable with at least one external memorizing device comprising a ROM and CD-ROM driver, said video gaming apparatus having a data-handling device, a voice-regenerating device, a control pad and an interface connected with said control pad, through said CD-ROM driver connected to said interface connectable with external memorizing devices, said method comprising the steps of connecting said at least one external memorizing device to said interface, reading and regenerating said photographic data stored in said optical disk through said CD-ROM driver connected to said interface connectable with said external memorizing devices, in accordance with system operation programs consisting of (1) a system control program, (2) a CD-ROM driver control program, and (3) a photographic data-enlarging program, which are stored in said ROM or in another external memorizing device, and steps of performing dealing and controlling of referring, zooming and panning operations of said photographic data, in accordance with a utility-controlling program stored in said ROM or in another external memorizing device.

2. A method of reading out and regenerating compressed photographic data stored in an optical disk from a video gaming apparatus comprising an interface connectable with at least one external memorizing device comprising a ROM and CD-ROM driver or CD-ROM driver, said video gaming apparatus comprising a data-handling device, a voice-regenerating device, a control pad and an interface connect with said control pad, through a CD-ROM driver connected to said interface connected with said control pad, through a CD-ROM driver connected to said interface connectable with said external memorizing devices, said method comprising the steps of connecting said at least one external memorizing device to said interface, reading and regenerating said photographic data stored in said optical disk through said CD-ROM driver connected to said interface connectable with said external memorizing device, by applying RAM functioning as a working area connected to said interface as an area to enlarge said photographic data, in accordance with system operation programs comprising (1) a system controlling program, (2) a CD-ROM driver-controlling program, and (3) a photographic data-enlarging program, which are stored in said ROM or in another external memorizing device, and steps of performing dealing and controlling of referring, zooming and panning operations of said photographic area, in accordance with a utility-controlling program, which is stored in said ROM or in another external memorizing device.

3. A method of reading out and regenerating compressed photographic data stored in an optical disk from a video gaming apparatus comprising an interface connectable with at least one external memorizing device comprising a ROM and CD-ROM driver or CD-ROM drive, said video gaming apparatus comprising a data-handling device, a voice-regenerating device, a control pad and an interface connected with said control pad, through a CD-ROM driver connected to said interface, said method comprising connecting said at least one external memorizing device to said interface, reading said photographic data stored in said optical disk through said CD-ROM driver, and enlarging said read-out photographic data in an enlarging device connected to said interface, controlling said photographic data in accordance with an enlarging device controlling program stored in said ROM or in another external memorizing device, and performing controlling steps of dealing and controlling of referring, zooming and panning operations of said photographic data, in accordance with a utility program stored in said ROM or in another external memorizing device.

4. A method of reading out and regenerating compressed photographic data according to any one of claims 1 or 2 or 3, wherein said method further comprises providing a printer connected to said interface connectable to said at least one external memorizing device, printing out said read-out from said optical disk through said CD-ROM driver and regenerating photographic data, in accordance with a printer-controlling program and a printout data-dealing program, stored in said ROM and/or said external memorizing device, and said ROM and said external memorizing device being connected to said interface.

* * * * *